United States Patent
Schmidt

(10) Patent No.: US 12,043,748 B2
(45) Date of Patent: Jul. 23, 2024

(54) PHOTO-CURABLE LIQUID COMPOSITION FOR ADDITIVE MANUFACTURING OF CERAMIC

(71) Applicant: Raytheon Technologies Corporation, Farmington, CT (US)

(72) Inventor: Wayde R. Schmidt, Pomfret Center, CT (US)

(73) Assignee: RTX CORPORATION, Farmington, CT (US)

(*) Notice: Subject to any disclaimer, the term of this patent is extended or adjusted under 35 U.S.C. 154(b) by 637 days.

(21) Appl. No.: 17/030,475

(22) Filed: Sep. 24, 2020

(65) Prior Publication Data

US 2022/0089887 A1 Mar. 24, 2022

(51) Int. Cl.

| | |
|---|---|
| C09D 11/10 | (2014.01) |
| B28B 1/00 | (2006.01) |
| B29C 64/124 | (2017.01) |
| B33Y 10/00 | (2015.01) |
| B33Y 70/00 | (2020.01) |
| C01B 32/977 | (2017.01) |
| C08G 77/20 | (2006.01) |
| C09D 11/101 | (2014.01) |
| C09D 11/102 | (2014.01) |
| B29K 83/00 | (2006.01) |

(52) U.S. Cl.
CPC ............ C09D 11/101 (2013.01); B28B 1/001 (2013.01); B29C 64/124 (2017.08); B33Y 10/00 (2014.12); B33Y 70/00 (2014.12); C01B 32/977 (2017.08); C08G 77/20 (2013.01); C09D 11/102 (2013.01); B29K 2083/00 (2013.01)

(58) Field of Classification Search
CPC ......... C08L 83/16; C08K 77/60; C08K 77/20; C01B 32/977
See application file for complete search history.

(56) References Cited

U.S. PATENT DOCUMENTS

| | | | | |
|---|---|---|---|---|
| 5,872,170 A * | 2/1999 | Mine | ........................ | C08L 83/00 524/588 |
| 6,593,008 B2 | 7/2003 | Schmidt | | |
| 10,221,284 B2 | 3/2019 | Eckel | | |
| 10,300,624 B2 | 5/2019 | Schmidt | | |
| 10,703,025 B1 | 7/2020 | Biesboer et al. | | |
| 10,730,204 B2 | 8/2020 | Schmidt | | |
| 2011/0091722 A1* | 4/2011 | Koehne et al. | ......... | C08L 83/00 524/588 |
| 2018/0148379 A1 | 5/2018 | Schaedler et al. | | |
| 2018/0148585 A1 | 5/2018 | Eckel et al. | | |

FOREIGN PATENT DOCUMENTS

| | | |
|---|---|---|
| CN | 105601830 | 10/2018 |
| CN | 109280395 | 1/2019 |

OTHER PUBLICATIONS

Wang et al. Dendritic carbosilane-based macrophotoinitiator: synthesis, characterization, and photoinitiating behavior. Polym. Int., 56: 764-772 (2007). (Year: 2007).*
Zhang et al. UV-activated hydrosilylation: a facile approach for synthesis of hyperbranched polycarbosilanes. Applied Organometallic Chemistry. vol. 23, Issue 7. 2009. pp 253-290 (Year: 2009).*
Wang et al. Synthesis, characterization, and UV curing kinetics of hyperbranched polycarbosilane. Journal of Applied Polymer Science. vol. 107, Issue 6, Mar. 2008. pp. 3435-4120. (Year: 2008).*
Cramer et al. Photopolymerizations of Thiol-Ene Polymers without Photoinitiators. Macromolecules 2002, 35, 14, 5361-5365. (Year: 2002).*
European Search Report for European Patent Application No. 21197389.6 mailed Feb. 21, 2022.
Colombo, P., Schmidt, J., Franchin, G., Zocca, A., and Gunster, J. (2013). Additive manufacturing techniques for fabricating complex ceramic components from preceramic polymers. American Ceramic Society Bulletin. vol. 96(3). Mar. 2013. pp. 16-23.
Wang, X., Schmidt, F., Hanaor, D., Kamm, P.H., Li, S., and Gurlo, A. (2019). Additive manufacturing of ceramics and preceramic polymers: A versatile sterolithographic approach assisted by thiol ene click chemistry. Additive Manufacturing. vol. 27. pp. 80-90.

* cited by examiner

Primary Examiner — Sanza L. McClendon
(74) Attorney, Agent, or Firm — Carlson, Gaskey & Olds, P.C.

(57) ABSTRACT

A photo-curable liquid composition for additive manufacturing of silicon-containing carbide ceramic includes a polymethylvinylsilane (PMVS) resin that has photo-reactivity over a first photo-wavelength absorption range and a photo-initiator additive mixed with the PMVS resin. The photo-initiator additive has photo-reactivity over a second photo-wavelength absorption range that has an overlapping wavelength range with the first photo-wavelength absorption range. The PMVS and the photo-initiator additive are reactive to polymerize upon exposure to radiation having a wavelength in the overlapping wavelength range.

20 Claims, No Drawings

PHOTO-CURABLE LIQUID COMPOSITION FOR ADDITIVE MANUFACTURING OF CERAMIC

BACKGROUND

Additive manufacturing (AM) uses 3-D modeling to deposit (add) material, layer-by-layer or volumetrically, to form a desired component geometry. In contrast, traditional processes are subtractive and remove material to form a desired component shape, e.g., by machining, cutting, or other technique. AM is applicable to a variety of materials, such as plastics, metals, and ceramics. There are numerous different AM techniques, including direct laser melting (DLM), selective laser sintering (SLS), stereolithography, and electron beam melting (EBM), to name a few.

In aerospace and other industries, AM of ceramic is of interest for forming high performance components. One approach is to use a suspension of ceramic particles. Such an approach, however, may not be conducive to formation of highly refractory non-oxide ceramics because of challenges in sintering such ceramic particles.

SUMMARY

A photo-curable liquid composition for additive manufacturing of silicon-containing carbide ceramic according to an example of the present disclosure includes a polymethylvinylsilane (PMVS) resin having photo-reactivity over a first photo-wavelength absorption range and a photo-initiator additive mixed with the PMVS resin. The photo-initiator additive has photo-reactivity over a second photo-wavelength absorption range that has an overlapping wavelength range with the first photo-wavelength absorption range. The PMVS and the photo-initiator additive of the composition are reactive to polymerize upon exposure to radiation having a wavelength in the overlapping wavelength range.

In a further embodiment of any of the foregoing embodiments, the photo-initiator additive is selected from the group consisting of benzoin ethers, benzil ketals, alpha-dialkoxy-aceto-phenones, alpha-hydroxyl-alkyl-phenones, alpha-amino-alkyl-phenones, acyl-phosphine oxides, benzo-phenones/amines, thio-xanthones/amines, titanocenes, and combinations thereof.

In a further embodiment of any of the foregoing embodiments, the photo-initiator additive is selected from the group consisting of 1-hydroxycyclohexylphenyl-ketone, 2-hydroxy-2-methyl-1-phenylpropanone, bis-acyl-phosphine oxide, benzophenone and its derivatives, 2-hydroxy-4'-(2-hydroxyethoxy)-2-methylpropiophenone, 2,2-dimethoxy-2-phenylacetophenone, and ethyl (2,4,6-trimethylbenzoyl) phenylphosphinate.

In a further embodiment of any of the foregoing embodiments, the PMVS comprises an acryloyl group.

In a further embodiment of any of the foregoing embodiments, the PMVS has, by molar percent, from 5 to 50 of acryloyl groups.

In a further embodiment of any of the foregoing embodiments, a vinyl group of the PMVS is in an allyl group.

In a further embodiment of any of the foregoing embodiments, the PMVS has, by molar percent, from 5 to 50 of allyl groups.

In a further embodiment of any of the foregoing embodiments, the PMVS has, by molar percent, from 10 to 95 of vinyl groups.

In a further embodiment of any of the foregoing embodiments, the composition has, in parts by weight, from 25 to 99.9 of the PMVS resin and from 0.1 to 10 of the photo-initiator additive.

In a further embodiment of any of the foregoing embodiments, the composition further comprises a viscosity modifier selected from the group consisting of low molecular weight versions of the PMVS resin, compatible solvents, oligomeric material, functionalized monomeric compounds or combinations thereof.

In a further embodiment of any of the foregoing embodiments, the composition has, in parts by weight, from 2 to 40 of the viscosity modifier.

A photo-curable liquid composition for additive manufacturing of silicon-containing carbide ceramic according to an example of the present disclosure includes 90 to 99.9 parts by weight of a polymethylvinylsilane (PMVS) resin, and 0.1 to 10 parts by weight of a photo-initiator additive mixed with the PMVS resin.

In a further embodiment of any of the foregoing embodiments, the photo-initiator additive is selected from the group consisting of benzoin ethers, benzil ketals, alpha-dialkoxy-aceto-phenones, alpha-hydroxyl-alkyl-phenones, alpha-amino-alkyl-phenones, acyl-phosphine oxides, benzo-phenones/amines, thio-xanthones/amines, titanocenes, and combinations thereof.

In a further embodiment of any of the foregoing embodiments, the PMVS comprises an acryloyl group, and the PMVS has, by molar percent, from 5 to 50 of acryloyl groups.

In a further embodiment of any of the foregoing embodiments, a vinyl group of the PMVS is in an allyl group, and the PMVS has, by molar percent, from 5 to 50 of allyl groups.

In a further embodiment of any of the foregoing embodiments, the PMVS has, by molar percent, from 10 to 95 of vinyl groups.

In a further embodiment of any of the foregoing embodiments, the composition further comprises a viscosity modifier selected from the group consisting of low molecular weight versions of the PMVS resin, compatible solvents, oligomeric material, functionalized monomeric compounds or combinations thereof, and the composition has, in parts by weight, from 2 to 40 of the viscosity modifier.

In a further embodiment of any of the foregoing embodiments, the PMVS has photo-reactivity over a first photo-wavelength absorption range, and the photo-initiator additive has photo-reactivity over a second photo-wavelength absorption range that has an overlapping wavelength range with the first photo-wavelength absorption range. The PMVS and the photo-initiator additive are reactive to polymerize upon exposure to radiation having a wavelength in the overlapping wavelength range.

DETAILED DESCRIPTION

Additive manufacturing (AM) of ceramic is of interest for forming components in a variety of applications, such as components in gas turbine engines that are subjected to high temperatures. While pure oxide ceramics may be under consideration for some uses, there is also interest in carbide ceramics, namely silicon-containing carbides. Silicon-containing carbides, such as silicon carbide, are often highly refractory, which can make sintering via powder processing difficult because sintering temperatures near the melting point and/or the use of sintering aids would be needed. Silicon-containing carbides can also be formed via preceramic polymer processing using resins such as polysilanes or polycarbosilanes. The resin is cured (crosslinked) to form a green body, and then subjected to a pyrolysis process in a controlled environment to convert the resin to silicon carbide. In general, however, such resins are not designed to be photo-curable. As will be discussed, disclosed herein is a photo-curable liquid composition (hereafter "the composition") for AM of silicon-containing carbide ceramic.

The composition herein is directed to processes for forming silicon-containing carbide ceramic components using AM. Silicon carbide is of high interest, but other types of silicon-containing carbide ceramics may also be produced. In general, processing of the composition will involve an AM technique in which the composition is cured to form a green body, followed by a pyrolysis process to convert the cured resin to silicon-containing carbide ceramic. The selected AM technique and the pyrolysis process may be substantially the same as known for other materials. For example, the composition may be used in vat polymerization, material extrusion or material jetting techniques including fused deposition modeling (FDM), electrohydrodynamic jetting (e-jetting), stereolithography (SLA), digital light synthesis (DLS), laminated object manufacturing (LOM) or digital light processing (DLP), and the pyrolysis process may be substantially the same as known for other silicon-containing resins (polysilanes, polycarbosilanes, polysiloxanes and polycarbosiloxanes) that are processed to form silicon-containing carbide ceramic. Given this description, those of ordinary skill in the art will be able to identify AM techniques and pyrolysis processes that fit their particular needs.

The formulation of the composition includes a polymethylvinylsilane (PMVS) resin that is mixed with a photo-initiator additive. Other additives, modifiers, etc. may also be included in the composition to modify the properties of one or more of the fluid characteristics, composition reactivity, reaction chemistry, green body characteristics, or final ceramic properties.

As will also be discussed further below, the PMVS resin and the photo-initiator additive are "compatible" with each other in order to form the composition as a photo-curable formulation. In this regard, the PMVS has a photo-reactivity over a first photo-wavelength absorption range, and the photo-initiator additive has photo-reactivity over a second photo-wavelength absorption range. The second photo-wavelength absorption range has an overlapping wavelength range with the first photo-wavelength absorption range. The PMVS and the photo-initiator additive are reactive to polymerize upon exposure to electromagnetic radiation having a wavelength in the overlapping wavelength range. The overlap and reactivity may also be referred to herein as a "photo-match" between the PMVS and the photo-initiator additive, i.e., the photo-wavelength absorption ranges overlap and the PMVS and photo-initiator are reactive in the overlapping range.

It is to be understood that the term "photo" or variations of this term are used herein with reference to electromagnetic radiation in several spectral regions, including the visible wavelength region (about 400 to about 700 nanometers), the ultraviolet wavelength region (about 10 to about 400 nanometers), and the infrared wavelength region (about 700 nanometers to about 1 millimeter). For instance, "photo-curable" refers to a responsiveness of a composition to polymerize under exposure to electromagnetic radiation in the prescribed range, and "photo-initiator" refers to a responsiveness of a chemical constituent to initiate polymerization under exposure to electromagnetic radiation in the prescribed range.

Polymethylvinylsilane (PMVS) Resin

The PMVS is a reactive end-blocked PMVS. There are several types of the reactive end-blocked PMVS that can be used in the composition. Type A PMVS has the chemical structure:

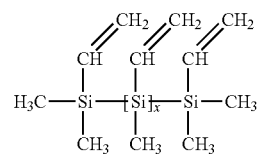

Type B PMVS includes moieties in the backbone chain that provide chain flexibility, which facilitates tailoring the viscosity of the liquid resin and the hardness of the cured resin of the green body. Type B PMVS has the chemical structure:

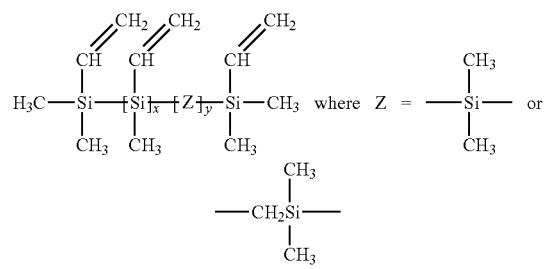

The chemical structures above are functionalized for polymerization with vinyl groups. The relative amount of vinyl groups in the PMVS can be modified in order to tailor the resin reactivity and degree of ceramic conversion. As an example, the PMVS has, by molar percent, from 10 to 95 of vinyl groups, meaning that between 10% and 95% of the repeat units in the silicon-based polymer chain contain vinyl groups.

In further examples, the PMVS is functionalized with one or more of allyl groups, acrylate groups, methacrylate groups, or combinations thereof. The chemical structures below demonstrate non-limiting examples that can be substituted for one or more of the vinyl groups on the base PMVS structures above.

Basic allyl group:

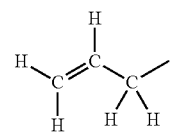

Basic acryloyl group:

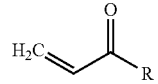

Allyl acrylate:

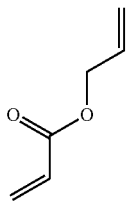

Allyl methacrylate:

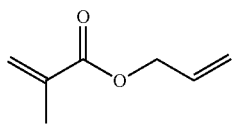

Pentaerythritol tetra-acrylate (PETA):

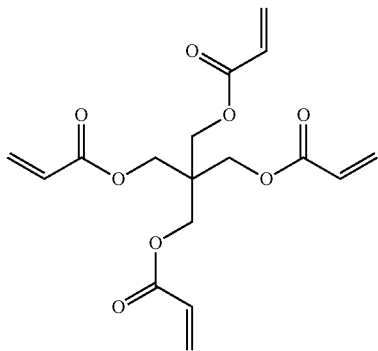 [SMILES: C=CC(=O)OCC(COC(=O)C=C)(COC(=O)C=C)COC(=O)C=C]

1,6-hexanediol diacrylate (HDA):

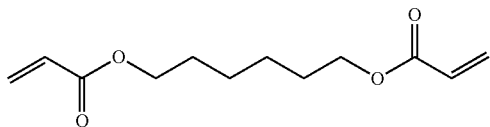 [SMILES: C=CC(=O)OCCCCCCOC(=O)C=C]

In further examples, the PMVS has, by molar percent, from 5 to 50 of allyl groups.

In further examples, the PMVS has, by molar percent, from 5 to 50 of acryloyl groups. It is also to be appreciated that combinations of any of the above functional groups are also contemplated, such as use of allyl groups and acryloyl groups or the use of vinyl groups and methacrylate groups. The above example amounts are, therefore, not mutually exclusive.

Chemical techniques for modifying PMVS in accordance with the examples above are generally known and, given this description, one of ordinary skill in the art will have no trouble preparing the desired PMVS or purchasing a pre-prepared PMVS with the desired chemical structure.

Photo-Initiator Additive

In contrast to the functional groups above for the PMVS that are bonded on the resin backbone, the photo-initiator additive is not bonded on the backbone. Rather, the photo-initiator additive is physically mixed with PMVS resin but is not covalently bonded on the backbone.

The photo-initiator additives are small molecules that are sensitive to electromagnetic radiation in the prescribed wavelength range discussed above. Upon absorption of electromagnetic radiation, the molecules undergo photo-chemical cleavage to produce reactive species (either free radicals or a Bronsted or Lewis acids) that interact with the active functional groups on the PMVS.

There are two types of photo-initiator additives that can be used in the composition. Type I photo-initiators are those that undergo unimolecular bond cleavage after absorption renders the reactive species. No other species are necessary in order for these photo-initiators to react. Type II photo-initiators undergo a bimolecular reaction. After absorption, the photo-initiator reaches an excited state from which it reacts with another molecule (a co-initiator or synergist, to extract hydrogen from an amine compound, in one example) to create the reactive species.

Whether Type I or II, for the composition to be photo-curable the photo-initiator and the PMVS must be photo-matched. Relevant photo-wavelength absorption ranges as used herein are ranges about a peak absorption wavelength, the bounds of which are determined by the profile of the absorption curve for the absorbing species. Approximating the profile of a single absorption peak to be Gaussian, a useful range of overlap would be between 1 and 2 standard deviation. In one example, a peak absorption minus 34% would provide acceptable overlap, so for a peak absorption of 0.8 arbitrary units, the range would be the low end wavelength at 0.528 absorption to the high end wavelength at 0.528 absorption. Moreover, the overlapping wavelength range must also overlap with the emission spectrum of the electromagnetic radiation source used for curing.

For enhanced efficiency, there should also be minimum competition for electromagnetic radiation absorption from other species in the composition. A poor photo-match between the photo-initiator and the PMVS and/or between the overlapping range and the emission spectrum of the electromagnetic radiation source used for curing is likely to result in a poor cure or no cure at all. Desired cure states are those in which the curing operation increases the initial viscosity of the composition being cured by a factor of at least 2 times and preferably greater than 5 times.

Photo-initiators that can be used in the composition are selected from the following, the absorption ranges for which may be found in literature or available from vendors: benzoin ethers, benzil ketals, alpha-dialkoxy-aceto-phenones, alpha-hydroxyl-alkyl-phenones, alpha-amino-alkyl-phenones, acyl-phosphine oxides, benzo-phenones/amines, thio-xanthones/amines, titanocenes, and combinations thereof. Further examples of these include, but are not limited to, acetophenone (99%); anisoin (95%); anthraquinone (97%); anthraquinone-2-sulfonic acid, sodium salt monohydrate (97%); (benzene) tricarbonylchromium (98%); benzil (98%); benzoin, sublimed (99.5+%); benzoin ethyl ether (99%); benzoin isobutyl ether, tech. (90%); benzoin methyl ether (96%); benzophenone (99%); benzophenone/1-hydroxycyclohexyl phenyl ketone, 50/50 blend; 3,3',4,4'-benzophenonetetracarboxylic dianhydride, sublimed (98%); 3,3',4,4'-benzophenonetetracarboxylic dianhydride, sublimed (98%); 2-benzyl-2-(dimethylamino)-4'-morpholinobutyrophenone (97%); 4,4'-bis(diethylamino) benzophenone (99+%); 4,4'-bis(dimethylamino) benzophenone (98%); camphorquinone (98%); 2-chlorothioxanthen-9-one (98%); (cumene)cyclopentadienyliron(II) hexafluorophosphate (98%); dibenzosuberenone (97%); 2,2-diethoxyacetophenone (95%); 4,4'-dihydroxybenzophenone (99%); 2,2-dimethoxy-2- phenylacetophenone (99%); 4 (dimethylamino) benzophenone (98%); 4,4'-dimethylbenzil (97%); 2,5-dimethylbenzophenone, tech. (95%); 3,4-dimethylbenzophenone (99%); diphenyl(2,4,6-trimethylbenzoyl)phosphine oxide/2-hydroxy-2-methylpropiophenone, 50/50 blend; 4'-ethoxyacetophenone (98%); 2-ethylanthraquinone (97+%); ferrocene (98%); 3'-hydroxyacetophenone (99+%); 4'-hydroxyacetophenone (99%); 3-hydroxybenzophenone (99%); 4-hydroxybenzophenone (98%); 1-hydroxycyclohexyl phenyl ketone (99%); 2-hydroxy-2-methylpropiophenone (97%); 2-methylbenzophenone (98%); 3-methylbenzophenone (99%); methybenzoylformate (98%); 2-methyl-4'-(methylthio)-2-morpholinopropiophenone (98%); phenanthrenequinone (99+%); 4'-phenoxyacetophenone (98%); thioxanthen-9-one (98%); triarylsulfonium hexafluoroantimonate salt 50% in propylene carbonate; triarylsulfonsium hexafluorophosphate salt 50% in propylene carbonate, 2,2-dimethoxy-1,2-diphenyl-ethan-1-one, bis (4-methoxybenzoyl) diethylgermanium, phenylbis (2,4,6-trimethylbenzoyl) phosphine oxide, ethyl (2,4,6-trimethylbenzoyl) phenylphosphinate, and combinations thereof.

An additional example photo-initiator includes bis-acylphosphine oxide (CAS #162881-26-7), such as IRGACURE® 819 by BASF SE and has maximum peak absorptions at 371 and 400 nanometers. Additional examples of photo-initiators are found in the IRGACURE® product family.

An additional example photo-initiator includes 2, 2'-azobis [2-methyl-n-(2-hydroxyethyl) propionamide] and has maximum peak absorption at 375 nanometers.

An additional example photo-initiator includes diphenyl (2,4,6-trimethylbenzoyl)phosphine oxide (CAS #75980-60-8), which absorbs between 273-370 nanometers.

Additional examples of photo-initiators include the Chemcure family of products as offered by Chembridge International Corp (http:///www.chembridge.com.tw/), including 2-hydroxy-2-methyl propiophenone (Chemcure-73/CAS #7473-98-5) which has maximum peak absorption at 245, 280 and 331 nanometers.

In a further example, the photo-wavelength absorption ranges of the PMVS and the photo-initiator overlap in a wavelength range 250 to 450 nanometers, and an electromagnetic radiation source is an ultraviolet LED lamp with a spectral output centered at 405 nanometers. For stereolithography techniques using the composition, a photomask may also be used, the operation of which must also match the absorption ranges and electromagnetic radiation source. For instance, the mask is an LCD panel that permits transmission of ultraviolet radiation.

Other Additives

As indicated above, the composition may also include other additions, such as but not limited to, viscosity modifiers, curing agents, composition modifiers, and/or other preceramic resins. Viscosity modifiers include lower molecular weight versions of the PMVS resin, compatible solvents, oligomeric material, functionalized monomeric compounds or combinations thereof. For example, lower molecular weight PMVS may have molecular weights ranging from 100-5000 Daltons or 10-25% of the molecular weight of the baseline PMVS viscosity. Compatible solvents for PMVS include alkanes such as pentane, hexane, octane, other hydrocarbons and the like. Oligomeric material includes short chain fragments of silane, carbosilane, siloxane and carbosiloxane compounds. Example functionalized monomeric compounds include tetraallylsilane and tetravinylsilane. Curing agents include functionalized compounds that can be polymerized independently, such as with heating or exposure to air. Composition modifiers include boron containing adducts such as borane-pyridine complex and metal powders to scavenge excess carbon from the starting PMVS during conversion to carbide ceramic. Other preceramic resins include perhydropoly(silazane), other vinylic poly(silanes), allyl-modified poly(carbosilane), functionalized poly(siloxane) and combinations thereof. It is contemplated that preceramic resin additions can also function as composition modifiers.

The following examples demonstrate additional non-limiting aspects of the composition.

Example 1

A composition is created combining 90 to 99.9 parts by weight of a polymethylvinylsilane (PMVS) resin and 0.1 to 10 parts by weight of a photo-initiator additive mixed with the PMVS resin without the use of solvent.

Additional Example Compositions

Example 2 (Generic)

In parts by weight
60-97.5 parts PMVS, unsubstituted;
0.5-6 parts photo-initiator, and
2-40 parts viscosity modifier.

Example 3 (Specific)

In parts by weight
75 parts PMVS, allyl substituted;
4 parts type I photo-initiator Irgacure 819®;
5 parts of an alkane hydrocarbon viscosity modifier;
16 parts of a poly(carbosilane) preceramic modifier resin.

Example 4 (Specific w/ Flexible Groups)

70 parts PMVS modified with flexible dimethylsilyl functional groups;
4 parts type I photo-initiator amino alkyl phenone;
10 parts of PMVS, unsubstituted, as a viscosity modifier,
16 parts of a perhydropoly(silazane) preceramic modifier resin.

Example 5 (Specific)

80 parts PMVS, allyl substituted;
4 parts type II photo-initiator 9 4-(dimethylamino) benzophenone;
5 parts of an alkane hydrocarbon viscosity modifier;
11 parts of a poly(carbosilane) preceramic modifier resin.

Example 6 (Specific)

65 parts PMVS, allyl acrylate substituted;
2 parts type I photo-initiator 2,2-dimethoxy-1,2-diphenyl-ethan-1-one;
8 parts of tetraallylsilane as a viscosity modifier;
25 parts of a poly(vinylsilane) preceramic modifier resin.

Example 7 (Specific)

25 parts PMVS, allyl acrylate substituted;
25 parts PMVS, allyl substituted;

5 parts type I photo-initiator 1-hydroxycyclohexyl phenyl ketone;
15 parts PMVS, unsubstituted, as a viscosity modifier,
30 parts of silicon metal powder as a composition modifier.

Example 8 (Specific)

75 parts PMVS, unsubstituted;
10 parts PMVS, allyl substituted;
5 parts type photo-initiator 3-methylbenzophenone;
10 parts borane-pyridine complex as a composition modifier.

Other examples and combinations of provided composition examples are contemplated.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A photo-curable liquid composition for additive manufacturing of silicon-containing carbide ceramic, the composition comprising a polymethylvinylsilane (PMVS) resin having photo-reactivity over a first photo-wavelength absorption range and a photo-initiator additive mixed with the PMVS resin, the photo-initiator additive having photo-reactivity over a second photo-wavelength absorption range that has an overlapping wavelength range with the first photo-wavelength absorption range, the PMVS and the photo-initiator additive of the composition being reactive to polymerize upon exposure to radiation having a wavelength in the overlapping wavelength range and wherein a vinyl group of the PMVS is in an allyl group.

2. The composition as recited in claim 1, wherein the photo-initiator additive is selected from the group consisting of benzoin ethers, benzil ketals, alpha-dialkoxy-aceto-phenones, alpha-hydroxyl-alkyl-phenones, alpha-amino-alkyl-phenones, acyl-phosphine oxides, benzo-phenones/amines, thio-xanthones/amines, titanocenes, and combinations thereof.

3. The composition as recited in claim 1, wherein the photo-initiator additive is selected from the group consisting of 1-hydroxycyclohexylphenyl-ketone, 2-hydroxy-2-methyl-1-phenylpropanone, bis-acyl-phosphine oxide, benzophenone and its derivatives, 2-hydroxy-4'-(2-hydroxyethoxy)-2-methylpropiophenone, 2,2-dimethoxy-2-phenylacetophenone, and ethyl (2,4,6-trimethylbenzoyl) phenylphosphinate.

4. The composition as recited in claim 1, wherein the PMVS further comprises an acryloyl group.

5. The composition as recited in claim 1, wherein the PMVS has, by molar percent, from 5 to 50 of allyl groups.

6. The composition as recited in claim 1, wherein the composition has, in parts by weight, from 25 to 99.9 of the PMVS resin and from 0.1 to 10 of the photo-initiator additive.

7. The composition as recited in claim 6, wherein the composition further comprises a viscosity modifier selected from the group consisting of low molecular weight versions of the PMVS resin, compatible solvents, oligomeric material, functionalized monomeric compounds or combinations thereof.

8. The composition as recited in claim 7, wherein the composition has, in parts by weight, from 2 to 40 of the viscosity modifier.

9. A photo-curable liquid composition for additive manufacturing of silicon-containing carbide ceramic, the composition comprising:
    90 to 99.9 parts by weight of a polymethylvinylsilane (PMVS) resin, wherein a vinyl group of the PMVS is in an allyl group; and
    0.1 to 10 parts by weight of a photo-initiator additive mixed with the PMVS resin.

10. The composition as recited in claim 9, wherein the photo-initiator additive is selected from the group consisting of benzoin ethers, benzil ketals, alpha-dialkoxy-aceto-phenones, alpha-hydroxyl-alkyl-phenones, alpha-amino-alkyl-phenones, acyl-phosphine oxides, benzo-phenones/amines, thio-xanthones/amines, titanocenes, and combinations thereof.

11. The composition as recited in claim 10, wherein the PMVS comprises an acryloyl group, and the PMVS has, by molar percent, from 5 to 50 of acryloyl groups.

12. The composition as recited in claim 10, wherein a vinyl group of the PMVS is in an allyl group, and the PMVS has, by molar percent, from 5 to 50 of allyl groups.

13. The composition as recited in claim 10, wherein the PMVS has, by molar percent, from 10 to 95 of vinyl groups.

14. The composition as recited in claim 9, wherein the composition further comprises a viscosity modifier selected from the group consisting of low molecular weight versions of the PMVS resin, compatible solvents, oligomeric material, functionalized monomeric compounds or combinations thereof, and the composition has, in parts by weight, from 2 to 40 of the viscosity modifier.

15. The composition as recited in claim 9, wherein the PMVS has photo-reactivity over a first photo-wavelength absorption range, and the photo-initiator additive has photo-reactivity over a second photo-wavelength absorption range that has an overlapping wavelength range with the first photo-wavelength absorption range, the PMVS and the photo-initiator additive being reactive to polymerize upon exposure to radiation having a wavelength in the overlapping wavelength range.

16. A photo-curable liquid composition for additive manufacturing of silicon-containing carbide ceramic, the composition comprising a polymethylvinylsilane (PMVS) resin having photo-reactivity over a first photo-wavelength absorption range and a photo-initiator additive mixed with the PMVS resin, the photo-initiator additive having photo-reactivity over a second photo-wavelength absorption range that has an overlapping wavelength range with the first photo-wavelength absorption range, the PMVS and the photo-initiator additive of the composition being reactive to polymerize upon exposure to radiation having a wavelength in the overlapping wavelength range.

17. The composition as recited in claim 1, wherein the photo-initiator additive is selected from the group consisting of alpha-amino-alkyl-phenones, acyl-phosphine oxides, benzo-phenones/amines, thio-xanthones/amines, titanocenes, and combinations thereof.

18. The composition as recited in claim 1, wherein the photo-initiator additive is selected from the group consisting of 1-hydroxycyclohexylphenyl-ketone, 2-hydroxy-2-methyl-1-phenylpropanone, bis-acyl-phosphine oxide, 2-hydroxy-4'-(2-hydroxyethoxy)-2-methylpropiophenone, and ethyl (2,4,6-trimethylbenzoyl) phenylphosphinate.

19. The composition as recited in claim 1, wherein the PMVS resin has a chemical formula of:

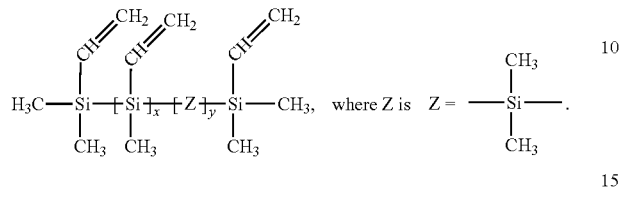

20. The composition as recited in claim 1, wherein the PMVS resin has a chemical formula of:

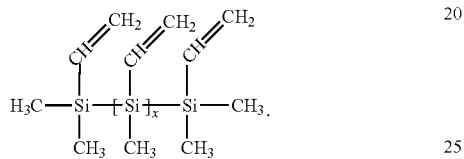

* * * * *